Dec. 16, 1952        G. H. WARREN        2,621,487
SAFETY CONTROL MEANS FOR REFRIGERATING SYSTEMS
Filed Dec. 12, 1951
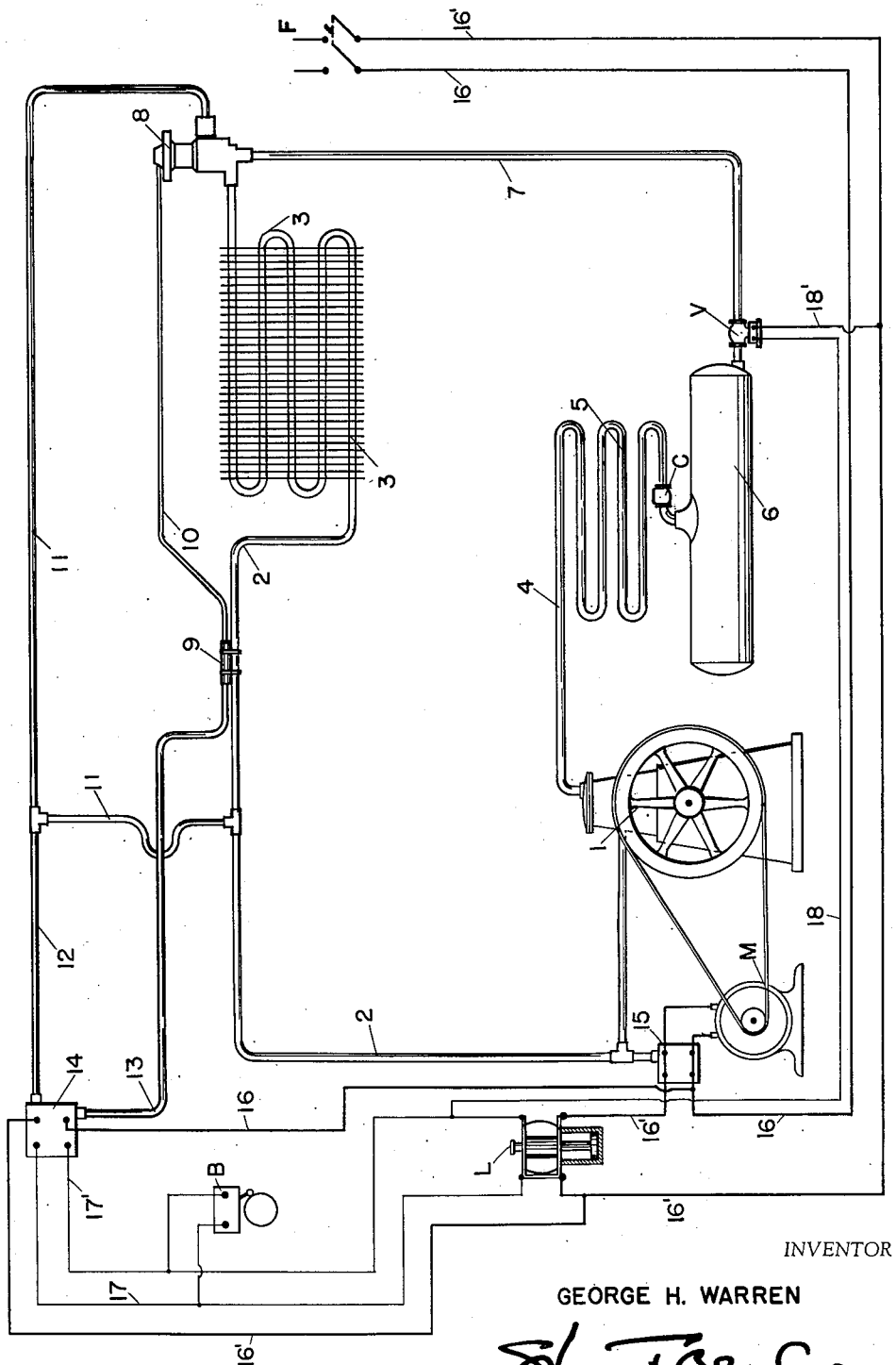
INVENTOR
GEORGE H. WARREN
BY *Stewart Blacker*
ATTORNEY Patented Dec. 16, 1952

2,621,487

UNITED STATES PATENT OFFICE 2,621,487

SAFETY CONTROL MEANS FOR REFRIGERATING SYSTEMS

George H. Warren, Miami Beach, Fla.

Application December 12, 1951, Serial No. 261,332

4 Claims. (Cl. 62—4)

The invention relates to refrigerating apparatus and, more particularly, to an improvement in automatic controls for systems of the refrigerant compression type.

It is one of the objects of this invention to provide a control assembly for a refrigerating system capable of utilizing the piping and elements in normal operation therein whereby to motivate the control apparatus and sound a warning signal upon the development of a leak in the refrigerant piping.

Another object is to provide control means of the character and for the purpose described which may be readily and economically installed.

A further object of the invention is to provide a safety control means for a refrigerating system which will be simple in assembly and efficient in use.

These and other advantages of the invention will be discernible from the detailed description thereof hereinafter set forth.

According to the invention, the system includes a refrigerant compressor and operating motor therefor, the usual piping conveying a refrigerant vapor to the compressor and discharging a refrigerant liquid therefrom, an electrical refrigerant pressure actuated switch means communicating with the piping and having electrical circuit connections with the compressor motor whereby to disable the compressor for the purpose of pumping down, shutting off operation of the system, and delivering a warning signal, upon the development of a leak in the refrigerant piping so as to prevent excessive loss of the refrigerant and preserve the system from injurious effects thereon.

A control apparatus to which the invention is applicable is embodied in the system exemplified in the accompanying drawing wherein like reference numerals designate identical elements therethrough.

The refrigerating apparatus may include the usual compressor 1, the intake of which receives a suction line 2 discharging from a cooling coil 3. Motive power for the compressor is supplied by a suitable electric motor M.

The compressor discharges through hot gas piping 4 and a suitable condenser coil 5 to a receiving tank 6, from which the liquid is conveyed by a conduit 7 to a thermal expansion valve symbolized by reference numeral 8. Thus, the fluid circuit so far described embodies the conventional flow of refrigerant in a system to which the invention has application.

Associated with the suction line 2 at a point on or adjacent the outlet portion of the cooling coil or evaporator 3, is a thermal bulb 9. In the preferred form of the invention this bulb may be clamped to the suction piping as illustrated in the drawing and a capillary tube 10 connected thereto for communication by fluid with the thermal expansion valve 8. It will be understood that the thermal bulb and thermal expansion valve constitute devices which are well known in the art in their functions in a refrigerant circulating system; the bulb being a temperature-sensitive vessel designed to be influenced by the temperature of line 2 with which it is in contact thereby developing a fluid pressure in said bulb responsive to this temperature. Through the capillary connection with the thermal expansion valve 8, this bulb will influence well known bellows expedients constructed within the valve 8 whereby this valve governs the flow of liquid refrigerant to the evaporator 3 in accordance with the temperature condition obtaining in the line to which the bulb is clamped. It will not, therefore, be necessary to further amplify the construction or functional purpose of the bulb and thermostatic valve in their installation herein.

Equalizer piping 11 provides communication between the thermal expansion valve 8 and suction piping 2. At a convenient point thereon, suction line 2 is made to communicate through a pressure conduit 12 with a pressure differential-operable electric switch means 14, to which is also connected a second pressure conduit 13 taken off the thermal bulb 9. The suction line 2 is returned to the compressor in conventional manner and a pressure responsive switch 15 interposed therein for a purpose to be hereinafter described in conjunction with the functioning of the pressure differential switch 14.

There is thus far described a typical refrigerant circulating system to which pressure conduits 12 and 13 are connected to provide pressure sensing expedients for the switch 14.

In practice, the thermal expansion valve 8 functions to maintain a temperature differential as between the refrigerant boiling in the evaporator 3 and the superheated refrigerant vapor which reacts upon the thermal bulb 9. The bulb is, in consequence, under pressure corresponding to the temperature equivalent imposed thereon; the temperature thus imposed will normally exceed that of the fluid boiling in the coil 3 by about 10 degrees, F. Assuming now that a leak develops in refrigerant piping, the refrigerant seal intervening between the receiver 6 and thermal expansion valve 8 will be thereby broken, causing a collection of bubbles of vapor at the point of expansion thus resulting. A reduction in the capacity of the thermal expansion valve 8 will likewise follow, thereby producing a rise in superheat in thermal bulb 9. The pressure in this bulb will now become elevated over that in suction line 2, the differential therebetween being transmitted in effect to the switch 14 through pressure conduits 12 and 13 which, it will be understood, are each directed to corresponding low and high sides of the pressure sensing mechanism residing in switch 14. This switch, known in the art, is responsive to the unbalance of a pre-determined pressure differential directed thereto so as to make or break an electric circuit in which the switch is connected. That is to say, if the pressure-sensing switch-operating mechanism be adjusted to maintain the pressure differential between bulb 9 and suction line 2 at ten pounds, but due to the foregoing refrigerant leak condition the differential mounts to eleven pounds, the pressure-sensing mechanism will close the switch to energize a circuit through relay L to thereby open the circuit from the power feeders to motor M, inactivating the system's operation as hereinabove described.

Differential switch 14 is connected in circuit to receive current from a pair of leads 16 and 16' which are taken off a corresponding pair of feeders shown at F. Upon the rise in the pressure differential directed to this switch as the result of the leak which disturbed the pre-determined differential for which the switch was set, leads 17 and 17' become energized to sound a bell B in circuit therewith, and a magnetically-operated valve V, positioned to close the outlet from receiver 6, has its coil energized to shut this normally open valve and prevent the dissipation of refrigerant from the receiver. At the same time, a time delay switch L is energized through leads 17 and 17' to initiate travel of a dashpot which will interrupt the power leads 16 and 16' serving the motor M, thus shutting off the compressor 1.

The receiver 6, the inlet of which is fitted with the usual check valve C, will then receive the pump-down which follows during the pre-determined interval that elapses between the closing of the magnetic valve V and the disabling of the motor M. Upon the sounding of the alarm B, the attendant will have discovered and repaired the leak which initiated the foregoing cycle of shutting off the refrigerant circulation throughout the system and operation thereof may be resumed, as will be understood.

An additional safeguard in the expedient of the low pressure sensitive switch 15 may be interposed in the motor circuit, and becomes operative in a manner well known in the art to interrupt this circuit upon a drop in suction pressure in line 2.

The invention is thus seen to provide a safety control means operable upon the development of a refrigerant leak in the system, which meets the objectives hereinabove set forth, at a minimum of cost and installation of equipment and employing, in the main, the ordinary essential elements found in systems of the herein described character.

Of course, the invention is susceptible of various changes and modifications without departing from the scope of the appended claims as hereinafter set forth.

What I claim as new and desire to secure by Letters Patent, is:

1. The combination with refrigerating apparatus comprising an electric motor, a compressor driveable thereby and an electrical power circuit normally energizing said motor, a condenser communicating with said compressor, an evaporator, means including a conduit and a thermostatic valve disposed in said conduit for supplying said evaporator with liquid refrigerant from said condenser, means including a discharge conduit for conveying vaporous refrigerant from said evaporator to said compressor, a temperature-sensitive and pressure-developing bulb in operative association with said discharge conduit and in capillary tubing communication with said thermostatic valve for the actuation thereof to control the liquid refrigerant supply to said evaporator responsive to pressure fluctuations in said bulb, of a first pressure conduit connected with said discharge conduit and a second pressure conduit connected with said bulk, of pressure differential-operable switch means electrically connected in said power circuit and having fluid connections with said pressure conduits whereby to interrupt said power circuit for the de-energization of said motor upon the delivery of a pre-determined differential in the pressures of said pressure conduits.

2. In a refrigerating apparatus including an electric motor, a compressor driven thereby and positioned in a refrigerant circulating system including a condenser, an evaporator supplied thereby and a thermostatic valve interposed therebetween, a temperature-sensitive and pressure-developing bulb in operative engagement with the discharge end of said evaporator and in capillary fluid communication with said thermostatic valve for the actuation thereof to control the supply to said evaporator in response to pressure fluctuations in said bulb, a discharge conduit connecting said evaporator with said compressor, the combination with said system of a first pressure conduit connected with said discharge conduit and a second pressure conduit connected with said bulb, an electrical circuit normally energizing said motor and pressure differential-operable electric switch means interposed in said circuit and having fluid communication with said pressure conduits to interrupt said circuit for the de-energization of said motor in response to a pre-determined differential in pressures developing in said pressure conduits.

3. In a refrigerating apparatus including an electric motor, a compressor driven thereby and positioned in a refrigerant circulating system comprising a condenser and receiver therefor, an evaporator supplied by said receiver and a thermostatic valve interposed therebetween, a normally open magnetically-operated valve controlling the discharge end of said receiver, a temperature-sensitive and pressure-developing bulb in operative contact with the discharge end of said evaporator and in capillary fluid communication with said thermostatic valve for the motivation thereof to govern the supply to said evaporator in response to pressure fluctuations in said bulb, a discharge conduit connecting said evaporator with said compressor, the combination with said system of an electrical circuit to normally energize said motor and a time-delay circuit breaker interposed in said circuit, pressure differential-operated switch means having dual pipe connections from said discharge conduit and said bulb and connected in electrical circuit with said magnetic valve and said breaker whereby to shut off said receiver discharge and effect the delayed disablement of said motor in response to a predetermined differential in pressures in said discharge conduit and said bulb.

4. The combination with refrigerating apparatus comprising a prime mover and a compressor driveable thereby, a condenser communicating with said compressor, an evaporator, means including a conduit and a thermostatic valve disposed in said conduit for supplying said evaporator with liquid refrigerant from said condenser, means including a discharge conduit for conveying vaporous refrigerant from said evaporator, to said compressor, a temperature-sensitive and pressure-developing bulb in operative association with said discharge conduit and in capillary tubing communication with said thermostatic valve for the actuation thereof to control the liquid refrigerant supply to said evaporator responsive to pressure fluctuations in said bulb, of a first pressure conduit connected with said discharge conduit and a second pressure conduit connected with said bulb, pressure-differential sensing means having fluid connections with said pressure conduits and in operative association with said prime mover for the deactivation thereof upon the delivery to said sensing means of a predetermined differential between the pressures of said pressure conduits.

GEORGE H. WARREN.

REFERENCES CITED

The following references are of record in the file of this patent:

UNITED STATES PATENTS

| Number | Name | Date |
|---|---|---|
| Re. 19,700 | Williams | Sept. 10, 1935 |
| 2,269,864 | Shaw | Jan. 13, 1942 |
| 2,327,544 | Newton | Aug. 24, 1943 |
| 2,355,894 | Ray | Aug. 15, 1944 |
| 2,389,073 | Newton | Nov. 13, 1945 |
| 2,439,331 | Bean | Apr. 6, 1948 |